Dec. 29, 1953 A. J. MONTCHAUSSE 2,664,468

COMMUTATING MECHANISM FOR CROSSBAR SWITCHES

Filed Feb. 25, 1950 9 Sheets-Sheet 1

Inventor
ANDRE J. MONTCHAUSSE

By Robert Harding Jr.
Attorney

Dec. 29, 1953 A. J. MONTCHAUSSE 2,664,468

COMMUTATING MECHANISM FOR CROSSBAR SWITCHES

Filed Feb. 25, 1950 9 Sheets-Sheet 2

Inventor
ANDRE J. MONTCHAUSSE

By Robert Harding Jr.
Attorney

Dec. 29, 1953 A. J. MONTCHAUSSE 2,664,468

COMMUTATING MECHANISM FOR CROSSBAR SWITCHES

Filed Feb. 25, 1950 9 Sheets-Sheet 3

Inventor
ANDRE J. MONTCHAUSSE

By Robert Harding Jr.
Attorney

Inventor
ANDRE J. MONTCHAUSSE
By Robert Harding Jr.
Attorney

Inventor
ANDRE J. MONTCHAUSSE
By Robert Harding Jr.
Attorney

Dec. 29, 1953 A. J. MONTCHAUSSE 2,664,468

COMMUTATING MECHANISM FOR CROSSBAR SWITCHES

Filed Feb. 25, 1950

9 Sheets-Sheet 6

Inventor
ANDRE J. MONTCHAUSSE

By Robert Harding Jr.
Attorney

COMMUTATING MECHANISM FOR CROSSBAR SWITCHES

Filed Feb. 25, 1950 9 Sheets-Sheet 7

Inventor
ANDRE J. MONTCHAUSSE
By Robert Harding Jr.
Attorney

Inventor
ANDRE J. MONTCHAUSSE
By Robert Harding Jr.
Attorney

Inventor
ANDRE J. MONTCHAUSSE

By Robert Harding Jr.
Attorney

Patented Dec. 29, 1953

2,664,468

UNITED STATES PATENT OFFICE 2,664,468

COMMUTATING MECHANISM FOR CROSSBAR SWITCHES

André J. Montchausse, Paris, France, assignor to International Standard Electric Corporation, New York, N. Y., a corporation of Delaware Application February 25, 1950, Serial No. 146,211

Claims priority, application France March 9, 1949

4 Claims. (Cl. 179—27.54)

Figure 1:
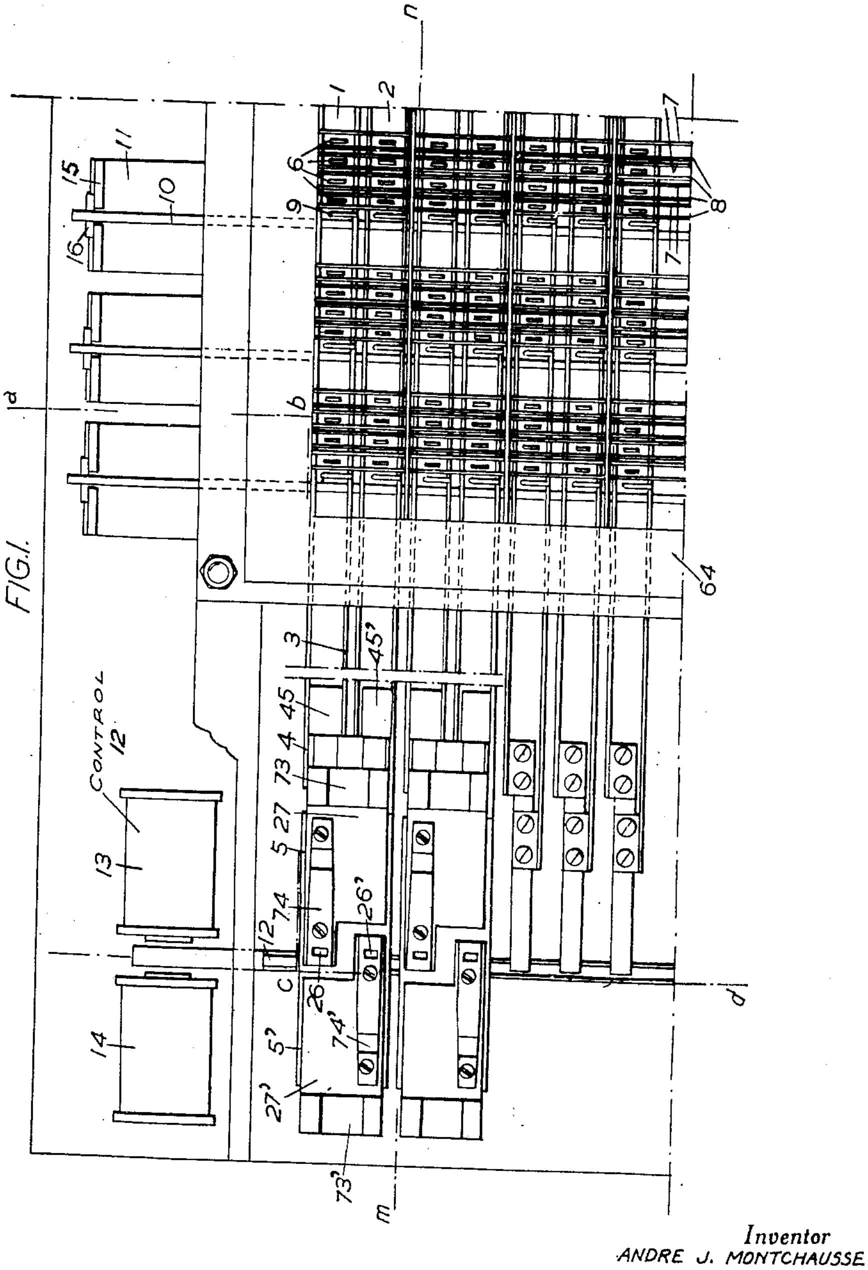

In certain apparatus such as, for example, commutating apparatus, movable bars are used to cause the desired operations or commutations. It is particularly necessary to provide devices permitting on one hand to cause the operation of a predetermined bar and, on the other hand, to maintain this bar in its working position during the whole time when the operation must be effected or the commutation established.

The present invention has for its objects, arrangements permitting, by simple means, the operation of the movable bars, as well as mounting arrangements for these bars and, as an example, an embodiment of a multi-selector for the selection and the switching of electrical circuits.

One of the characteristics of the invention resides in a combined clutching and interlocking system for a movable bar in which the interlocking device under the action of a control arrangement associated with the movable bar places the clutch device under the dependence of a displacement member for the movable bar, this displacement, in order to bring the said bar in working position, having for effect to cause the operation of the interlocking device which frees the clutching device, the latter being able to return to its rest position, the interlocking device being maintained in its position of engagement, corresponding to a working position of the movable bar, through the action of the control device associated with the said bar.

Another characteristic of the invention resides in the fact that when the control device associated with a movable bar, returns to a rest position and ceases to act on the interlocking device, the disengaging of the interlocking device occurs automatically and the movable bar, under the action of any appropriate device, returns to a rest position, the clutching device being again placed under the dependence of the movement of the interlocking device.

Another characteristic of the invention resides in a combined clutching and interlocking system for a movable bar permitting, by using the same clutching device, the displacement in two opposite directions of the movable bar in order to obtain two different working positions for the said bar, the interlocking device having two distinct engaging positions for maintaining the bar in its two working positions.

Another characteristic of the invention resides in an interlocking device for the movable bar constituted by the combination of two pieces one of which is joined to the movement of the said bar, and the other is joined to the control device associated with the movable bar, these pieces being resilient, or under the action of a resilient device, and each comprising a catching hook; the piece joined to the movement of the movable bar abuts, in its rest position, through the end of its hook, against the end of the hook of the piece which is joined to the movement of the control device, the engagement of the movable bar in its working position being obtained by the catching of the hook of the piece joined to the movement of the said bar with one or the other of the sides of the hook of the piece joined to the control device following which the horizontal bar has been displaced in one direction or the other.

Another characteristic of the invention resides in a control device associated with the movable bar, the said device comprising an electromagnet and a rod acting on the combined clutching and interlocking system, the said rod being maintained in direction in a space provided in the armature of the electromagnet and mounted on a piece fixed on the said armature, the distance between the said piece and the armature being able to be adjusted in order to proceed with the adjustment of the position of the free end of the rod.

Another characteristic of the invention resides in a return device in the rest position of the movable bar, constituted by the combination of a forcing piece joined to the said movable bar, the said piece comprising a part of predetermined profile and of a lever, mounted on a fixed axis, subjected to the action of a resilient device, the said lever acting on the profiled part of the forcing piece in order to cause the return to rest position of the movable bar.

Another characteristic of the invention resides in a return lever acting on the movable bar in its rest position and constituted by two pieces one of which supports a thrust piece of the said bar and the other is mounted on the fixed pivotal axis of the lever, the relative position of these two pieces being able to be modified so as to permit a varying of the distance between the pivotal axis and the thrust piece in order to effect an adjustment of the rest position of the movable bar.

Another characteristic of the invention resides in an assembling and articulating arrangement of a movable bar and of a fixed bar permitting the displacement of the movable bar with respect to the fixed bar, in a predetermined direction to the exclusion of all other displacements, constituted by the combination of an assembly piece mounted in openings provided in the said bars and of a resilient system the action of which tends to push the bars against the assembling piece, the said piece being able to take a certain angle during the displacement, in one direction or in the other, of the movable bar.

Another characteristic of the invention resides in the arrangement of the bare vertical multiple wires of a multi-selector, the said wires being mounted on a movable frame and their ends being bent so as to come into contact at the time of mounting the frame on the framework of the selector, with fixed electrical plugs mounted on the said framework.

Figure 2:
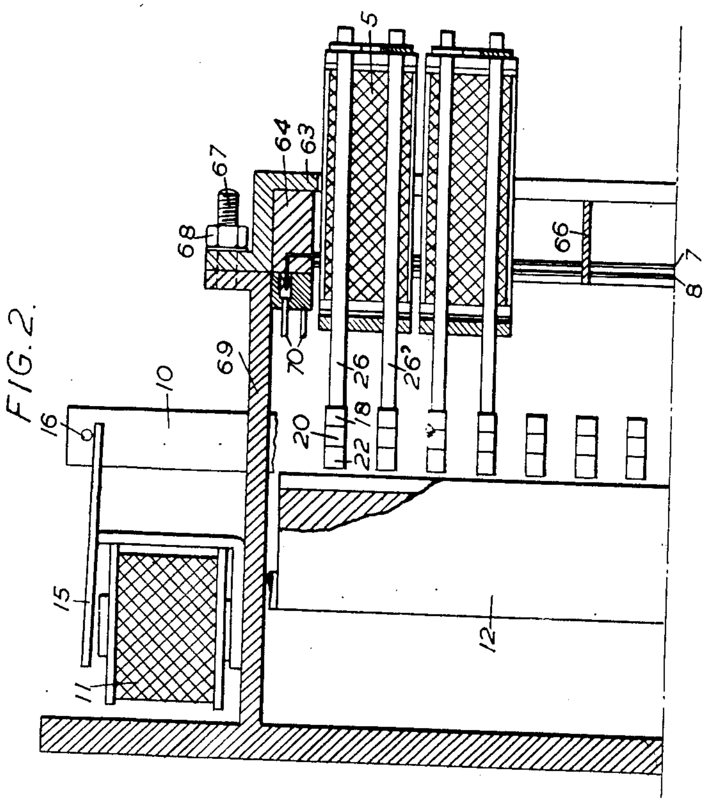
Figure 3:
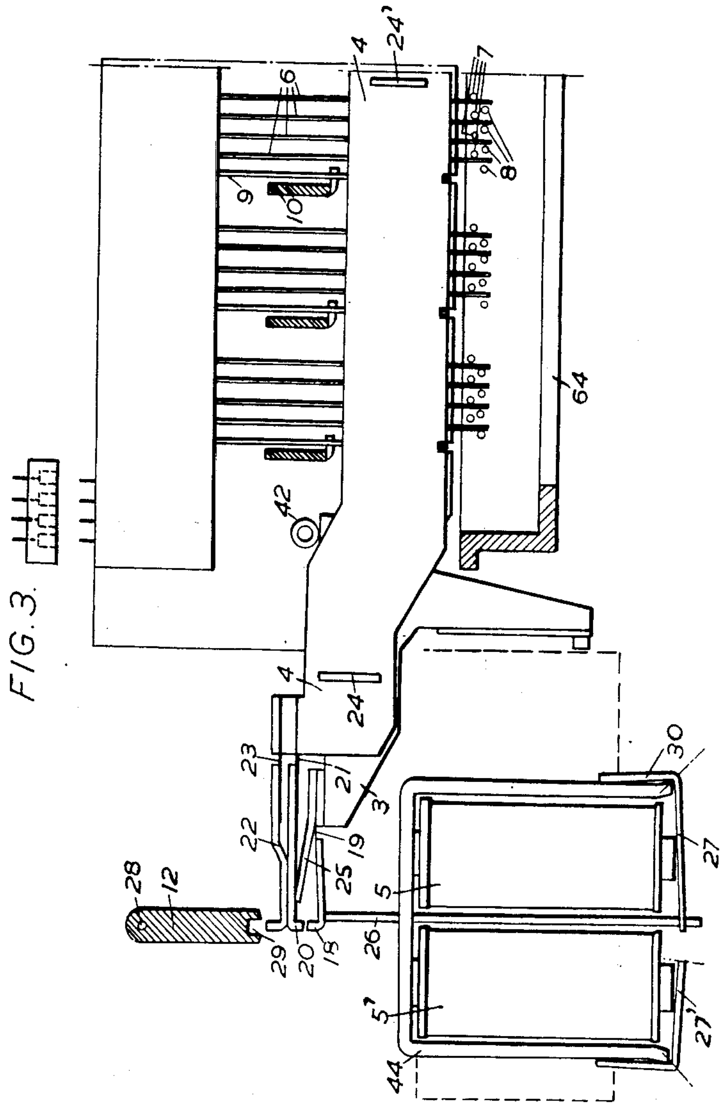
Figures 4, 4A, 5:
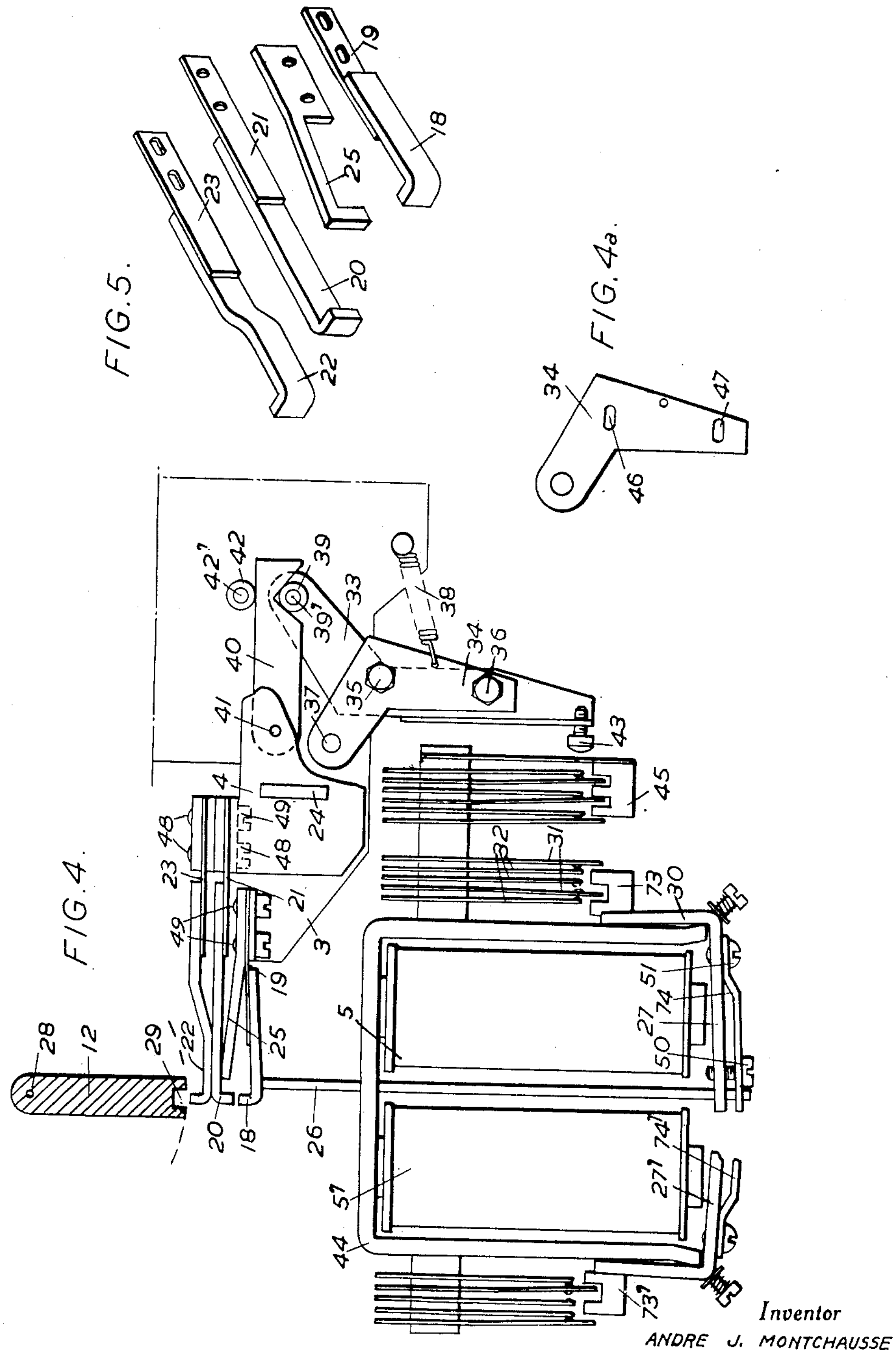
Figure 6:
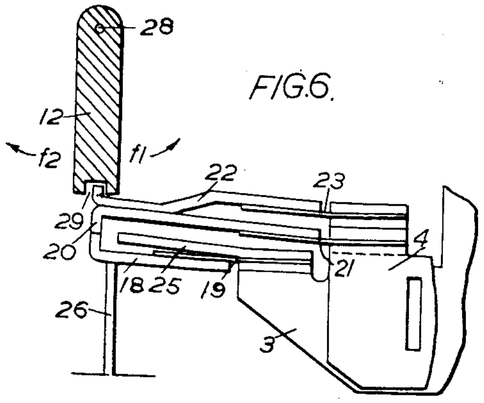
Figure 7:
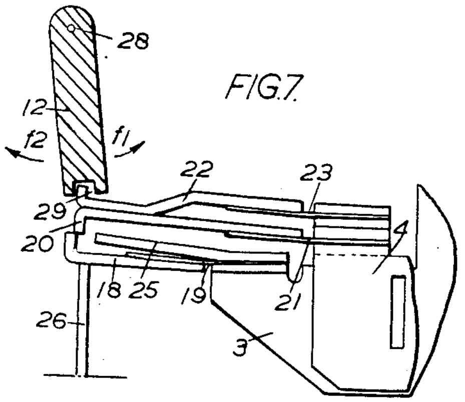
Figure 8:
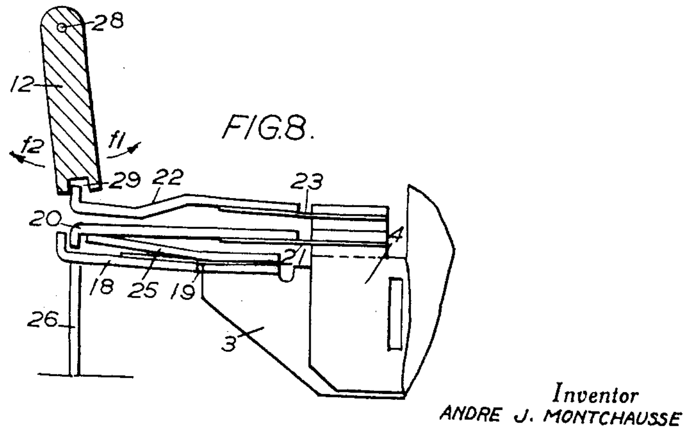
Figure 9:
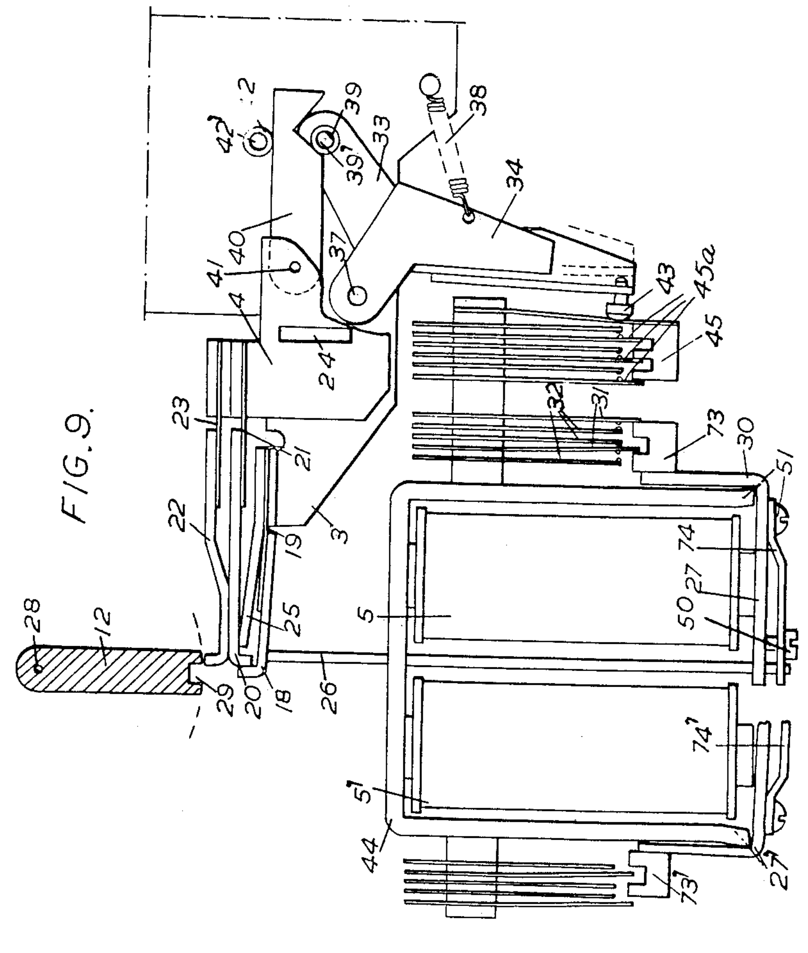
Figure 10:
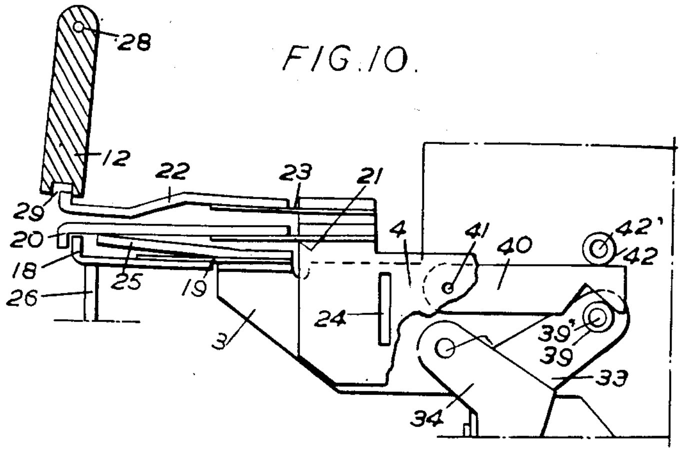
Figure 11:
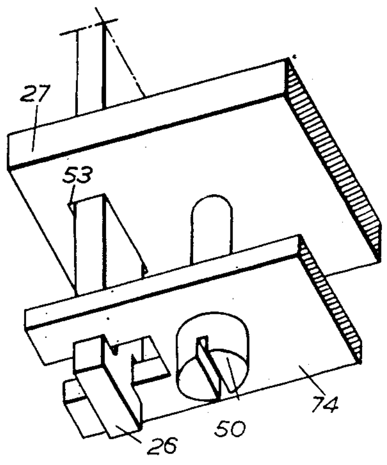
Figure 12:
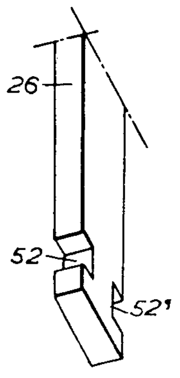
Figure 13:
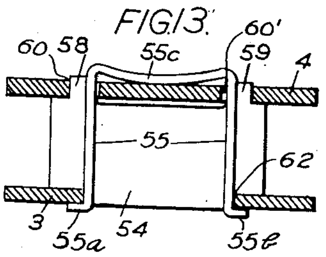
Figure 14:
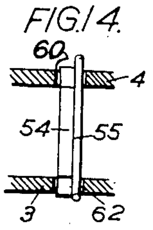
Figure 15:
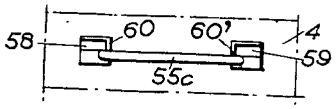
Figure 16:
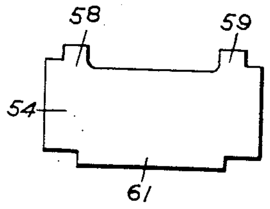
Figure 17:
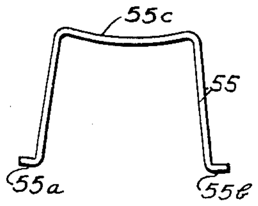
Figure 18:
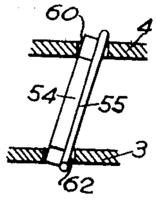
Figure 19:
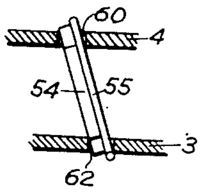
Figures 20, 21:
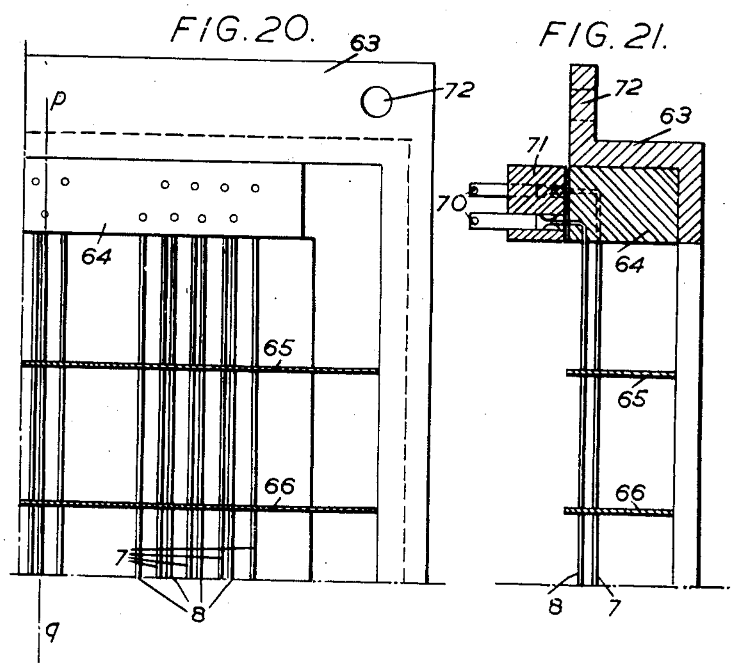

Different other characteristics will become apparent from the following description given for a non-limitative embodiment of a multi-selector which can be used in systems of telecommunication, telecontrol, telesignalling or the like, with respect to the appended figures which represent:

Fig. 1, a partial side view of a multi-selector,

Fig. 2, a cross-sectional view along *a, b, c, d*, of Fig. 1,

Fig. 3, a cross-sectional plan view along *m, n*, of Fig. 1,

Fig. 4, is a plan view of the combined clutch and interlocking system and of the return device in rest position (the different parts being shown in rest position), Fig. 4*a*, a plan view of the part constituting the mechanism of Fig. 4, for the return to rest of the horizontal bar, Fig. 5, a perspective view of different pieces of the clutching and engaging system, Figs. 6 to 8, the different positions of the clutching and engaging system during their operation, Figs. 9 to 10, the two catching positions of the engaging device for the movable piece, Fig. 11, a perspective view of the method of mounting and adjusting of the control rod of an electromagnet of a selector, Fig. 12, a perspective view of the end of the control rod of an electromagnet of the selector, Fig. 13, a cross-sectional view of an arrangement of assembling and articulation of the movable horizontal bar on the fixed bar, Fig. 14, a cross-sectional side view of Fig. 13, Fig. 15, a partial plan view of Fig. 13, Fig. 16, a side view of the assembling piece of the arrangement of Fig. 13, Fig. 17, a view of the mounting spring of the arrangement shown on Fig. 13, Figs. 18 and 19, two views of the arrangement of Fig. 13 in rocking position to the right and to the left, Fig. 20, a partial side view of the supporting frame of the vertical multiple wires seen from the inside, Fig. 21, a cross-sectional side view along *p-q* of Fig. 20, with the support of the resilient contacts fixed on the fixed frame, Figs. 22 to 25, schematic representations showing different manners of constituting a multiple bank.

It will be first explained, with reference to Figs. 1 to 3, how a multi-selector is constituted.

The multi-selector comprises, grouped in a single assembly, a certain number of selectors with their individual electromagnets controlling the clutching and the holding, the bank of vertical contacts and the control electro-mechanisms common to the different selectors.

A selector, such as 1, comprises a fixed horizontal bar 3, a movable horizontal bar 4, and an individual electromagnet 5 for the control of the clutching and the holding. The commutation mechanisms each of which is provided with an assembly of movable springs such as 6 have been assumed to be constituted as indicated in the copending patent application filed by the applicant on January 26, 1950, and bearing Serial No. 140,735. The said movable springs can be brought into contact either with the bare vertical multiple wires such as 7, if the movable horizontal bar is displaced towards the right, or with the bare multiple wires such as 8, if the said bar is displaced towards the left. The clutch levers such as 9, are controlled by a vertical movable bar 10, actuated by an electromagnet such as 11, acting through the armature 15 on a pin 16 rigidly mounted near one end of said vertical bar.

The displacement of the movable horizontal bars is obtained by the action of a common control bar 12 which, under the action of one of the electromagnets 13 or 14, can pivot around a vertical axis, either towards the right or towards the left.

The clutching and holding electromagnets 5' and 5 of the two superposed selectors 2 and 1 are located on the same horizontal plane as shown on Fig. 1. On Figs. 1 and 2 only the electromagnets associated with the four upper selectors have been represented.

It will now be explained with reference to Figs. 4 and 5 how one can realize according to the invention, a clutching, interlocking and holding mechanism for the movable horizontal bar.

A piece 18, the end of which is bent in the form of a hook, is fixed by means of a resilient blade 19 to the end of the fixed horizontal bar 3. The pieces 20 and 22, one of the ends of which is bent in the form of a hook, are fixed respectively by means of the resilient blades 21 and 23 to the end of the horizontal movable bar 4. The said horizontal bar 4 can be displaced towards the right or the left in relation to the fixed bar 3 by means of positioning devices such as 24 which will later be described in detail. The action of the resilient blades 19, 21 and 23 tends to displace respectively the pieces 18, 20 and 22 towards the bottom of the figure. The piece 20, under the action of the resilient blade 21, rests against an abutment 25 adjustable by deformation, joined to the fixed bar 3 as shown. The abutment 25 could nevertheless be joined to the movable bar 4. Under the action of the movable blade 19 the piece 18 rests on the push-rod 26 operated by the armature 27 of the individual relay 5 of the selector considered.

On Fig. 4, the mechanism is shown in rest position, the selector with which it is associated being free. It is seen that in this position, the mechanism cannot be actuated by the common bar 12 controlling the displacement of the selectors, the bar 12 being able to pivot towards the right or the left around the vertical axis 28.

It will now be assumed that the selector is seized for the establishment of a connection. The seizure of the selector has the effect of causing the energization of the electromagnet 5 which attracts its armature 27 and consequently, displaces the rod 26, which places the different pieces in the position indicated on Fig. 6. The end of the piece 22 is then engaged in the groove 29 of the control bar 12.

On the other hand, by means of the lever 30 (Fig. 4) and the pusher insulator 73, the relay 5 causes the displacement of the movable spring contacts 31 associated with the fixed spring contacts 32.

The direction in which the connection must be established has been marked in the multi-selector, by the operation of a vertical bar such as 10 (Fig. 3), which had actuated the clutch levers such as 9, of all the selectors associated with the movable springs such as 6, capable of being brought into contact with the desired line in order to render the said contacts jointly movable of the movable horizontal bar 4, as it has been explained in the above-mentioned copending patent application.

It will be assumed that the line with which the connection is established is constituted by the vertical wires 7 (Fig. 3). The movable springs 6 must therefore be displaced towards the right.

As it has been explained, the seizure of the free selector has had the effect of setting the members in the position shown on Fig. 6. When this operation is terminated the electromagnet 13 (Fig. 1) is energized and the control bar 12 pivots towards the right in the direction of the arrow $f_1$ (Fig. 6). In its movement the said bar 12 causes the displacement of the movable horizontal bar 4 towards the right by reason of the urging of piece 22 which rests in the groove 29 of bar 12 as indicated on Fig. 7. At the end of this track of displacement, the piece 20 no longer rests on the end of the piece 18, and, under the action of the resilient blade 21 comes to take the position indicated on Fig. 8, in which it rests on the abutment 25. From then on, the piece 22 is made independent of the piece 20 and can remain engaged with the control bar 12, due to a frictional effect as long as the said bar 12 is in working position.

When this operation is terminated, the springs 6 (Fig. 3) have come into contact with the vertical wires 7 and the connection is established. The circuit of the electromagnet 13 (Fig. 1) is then opened, the common control bar 12 returns to a rest position, as represented on the figure, under the action of any appropriate device, and the control members of the selector stand in the position indicated on Fig. 9, the electromagnet 5 remaining energized for the whole busy time of the selector. In this position, the piece 22 is again out of reach of the common control bar 12 which can then be used for the control of other selectors of the multi-selector.

The movable horizontal bar 4 is held in working position by the end of the piece 20 which is maintained engaged with the bent end of the piece 18 as indicated on Fig. 9 as long as the electromagnet 5 is energized, the rod 26 maintaining the piece 18 in the upper position while the electromagnet 5 is energized. The resilient blade 23 urges the piece 22 in a downward direction and out of engagement with the groove 29 and bar 12.

When the selector is freed, the circuit of the electromagnet 5 is opened, its armature 27 and the rod 26 return to the position of Fig. 4; under the action of the resilient blade 19 the piece 18 follows the rod 26 in its return to rest and, consequently frees the end of the piece 20 which is maintained in position by the rigid abutment 25.

The horizontal bar 4 then returns to a rest position and impels the pieces 20 and 22; finally the said pieces occupy the position indicated on Fig. 4 and the movable springs 6 are returned to their rest position.

The return of the horizontal bar 4 to a rest position is caused by a restoring and centering device which will now be described with reference to Fig. 4.

A lever constituted by the two pieces 33 and 34, joined together by the screws 35 and 36 can rotate around the pivot 37 which is fixed on the fixed horizontal bar 3; this lever is subjected to the action of a restoring spring 38 one of the ends of which is attached to the fixed piece 3. The axis of rotation 39′ of a roller 39 is fixed on the piece 33.

An actuating piece 40 is linked with the movable horizontal bar 4 by means of pivot 41 on which it can turn; the said piece 40 includes a notch in the form of an inverted V in which the roller 39 rests. The piece 40 itself bears against a guide roller 42 mounted on an axis 42′, attached to the fixed piece 3. It is seen that under these conditions, the roller 39 has the effect, due to the action of spring 38, to maintain the piece 40 against the roller 42, and consequently no lateral movement is transmitted to the movable horizontal bar 4.

When the movable horizontal bar 4 is displaced towards the right, the piece 40 takes the position indicated on Fig. 9, and by acting on the roller 39, makes the lever 33—34 pivot downwardly, to bring it into the position shown, stretching the spring 38. The end of lever piece 34 carries an adjustable pusher 43 which acts through a movable pusher 45 on a group of contact springs 45′ which make contact when the movable horizontal bar 4 has reached a working position.

The roller 39, under the combined action of spring 38 and the movable contact springs 45a associated with the movable pusher 45, exerts an upward thrust on the lever 40, whose longitudinal resultant directed towards the left, pushes the hook of the piece 20 against that of the piece 18 (Fig. 9).

When, as a result of the opening of the circuit of the electromagnet 5, the piece 18 returns to a rest position, the piece 20 is freed, as has been previously indicated. The action of the roller 39 on the piece 40 and consequently on the piece 4, acts to displace the movable horizontal bar 4 towards the left as well as the pieces joined to the said bar, and to return them to a rest position as indicated on Fig. 4, this position being determined by the setting into contact of the roller 39 with the two sides near the apex of the V of the piece 40. In this manner one obtains a well-defined rest position for the movable horizontal bar 4.

In the case where it is desired to bring the movable springs 6 (Fig. 3) into contact with the contact wires 8, the operations, as far as the seizure of the selector and its bringing into a working position are concerned, result, as it has been indicated in the previous case (movable springs 6 coming into contact with the vertical wires 7); when the members are in the position indicated on Fig. 6, the common control bar 12 is displaced in the direction of the arrow $f_2$ under the control of the electromagnet 14 (Fig. 1), the energizing circuit of which has been closed. The movable horizontal bar 4 is displaced towards the left and the hook of the piece 20 becomes engaged on the left of that of the piece 18 as indicated on Fig. 10. During the displacement of the bar 4, the roller 39 is depressed by the right-hand inclined portion of the V notch of the piece 40 and finally comes to occupy the same position as in the previous case, this again causing the operation of the pusher 45 similarly as shown in Fig. 9.

The roller 39 in Fig. 10 causes an effect on the piece 40 whose longitudinal component is directed towards the right; this action maintains the hook of the piece 20 caught with the hook of the piece 18 as indicated on Fig. 10. When the selector is freed, rod 26 frees the piece 18, which under the action of the resilient blade 19 returns downwardly to a rest position, thus freeing the hook of the piece 20. Under the action of the roller 39, the spring 38, lever piece 33 and horizontal bar 4 is displaced towards the right and returned to its rest position (Figs. 3 and 4).

The pushers 45 and 45' (Fig. 1) controlling the contact springs of two selectors such as 1 and 2, the electromagnets 5 and 5' which are mounted on the same supporting piece 44 (Fig. 4), are arranged as indicated on the said Fig. 1.

The control device for the return to the rest position of the movable horizontal bar 4 can be easily adjusted to obtain the position of the said movable bar, with respect to the fixed bar 3, which permits the engagement with the said bars of the controlling clutching pieces of the movable springs whose function has been described in the above-mentioned co-pending patent application.

Indeed, if one refers to Fig. 4, it is seen that the screws 35 and 36 having been unscrewed, due to the fact that the openings 46 and 47 (Fig. 4a) for the said screws in the piece 34 are in the form of elongated horizontal slots, one can displace the two pieces 33 and 34 forming the lever with respect to one another, in order to obtain the desired distance between the axis of pivots 37 and 39'. As previously explained, the axis of pivot 37 is fixed on the fixed horizontal bar 3, one may readily regulate in this way the rest position of the piece 40 and consequently that of the movable horizontal bar 4.

To proceed with the adjustment of the piece 22 so that its hook will rest in the groove 29 of the piece 12 (Fig. 4), the assembly of electromagnets 5 and 5' are removed, the screws 48 and 49 are loosened; the fixing holes in blades 23 and 29 being of elongated shape as indicated on Fig. 5, it is possible to adjust the setting of the piece 22 with respect to the movable bar 4; in a similar manner the position of the piece 18 can be adjusted in order to fix the engaging position of the hook of the piece 20 on the right and on the left of the hook of the piece 18. It is possible to effect by deformation, adjustment of the rigid piece 25, in order to leave between the path of the end of the control bar 12 (shown in dotted line) and the hook of the piece 22, the space necessary for a free movement of the said bar 22.

When the various adjustments indicated above of the pieces 18, 25 and 22 have been performed, the assembly of electromagnets 5 and 5' is put back in position and one may then proceed with the adjustment of the rest position of the rod 26 (Fig. 4). The end of the rod 26 is mounted on the armature 27 of the electromagnet 5 and comprises two rectangular slots 52 and 52', as indicated on Fig. 12; the said end having been introduced in to rectangular opening 53 (Fig. 11) provided in the armature 27, the rod 26 is assembled with the piece 74 as shown on the said figure. The piece 74 is unflexible in the vicinity of the point of attachment on the armature 27 being firmly held thereto by means of a screw 51 (Fig. 4). It is seen that by acting on the screw 50 near the point of assembly with rod 26, it is possible to modify the position of the free end of the rod 26 in such a manner that the piece 18 comes into contact with the piece 20 after a predetermined movement of the armature 27 of the electromagnet 5.

The pusher 43 is then adjusted to obtain the desired displacement for the movable pusher 45 when the selector is in working position.

The movable horizontal bar 4 (Fig. 3) is articulated on the fixed horizonal bar 3 by means of assembling devices such as 24 and 24' in a manner suitable to give to the said movable bar the possibility of a longitudinal rectilinear movement approximately parallel to the bar 3 to the exclusion of all other movements.

The details of assembly devices 24 and 24' will now be explained with reference to Figs. 13 to 17.

Each of the said devices is constituted by an assembling piece 54 and a U-shaped spring 55, the higher branch 55c of which is curvedly bent. The upper assembling parts 58 and 59 of the assembling piece 54 are disposed in openings 60 and 60', provided in the movable bar 4; the lower part 61 of the assembling piece 54 is set in an opening 62 provided in the fixed horizontal bar 3, the length of the said opening being approximately that of the width of part 61 with a width slightly larger than the sum of the thickness of the piece 54 and the diameter of the spring 55.

The slight play occurring between the outer edges of parts 58 and 59 with respect to the bar 4 on the one hand, and the edges of the part 54 with respect to the bar 3 on the other hand, prevents the lateral displacement of said bars in any appreciable amount, with respect to the assembling piece 54 and consequently with respect to one another.

The spring 55, by means of its two ends 55a and 55b, presses on the lower face of the fixed bar 3 and resiliently presses by means of its top branch 55c, on the top side of the movable bar 4, thus keeping the pieces 3, 4 and 54 assembled. It is seen that under these conditions any movement of one piece with respect to the others, in the view of Fig. 13 is practically prevented.

In the longitudinal direction, the movable piece 4 can be displaced in one direction or the other by sloping the piece 54 as represented on Figs. 18 and 19.

During its displacement, the movable bar 4 does not remain at a constant distance from the fixed bar 3. However, whenever the operation of the selector would require it, it would be possible to diminish this variation of the distance by a suitable choice of the thickness of the assembling pieces 54 which could, for example, be taken as equal to half the length of travel of the bar in one direction or the other.

It will now be explained by referring to Figs. 20 and 21 how one can realize a removable bank of bare wires which constitute the vertical multiple of the selector. The bank is supported by a removable frame 63. The bare wires such as 7 and 8 are bent at right angles at one of their ends and maintained by an assembly of insulating pieces such as 64; they are guided from place to place by insulating pieces such as 65 and 66.

The whole of the bank is removable; its mounting on the multi-selector is effected as indicated on Fig. 2. On the framework 69 of the multi-selector, threaded studs such as 67 are provided, which are adapted to project through the holes 72 (Fig. 21) which guide the bank while it is set in position. The fixing is obtained by means of nuts such as 68 adapted to be drawn down the threads of studs 67.

The top bent end of the multiple vertical wires 7 and 8 (Fig. 21) is inserted between fixed resilient contacts such as 70, supported by insulating pieces such as 71, joined to the framework of the multi-selector. In this manner, one obtains an electrical connection between the vertical wires of the multiple and the electrical circuits connected to contacts 70. In this manner one can easily proceed with the insertion or the removal of the bank of the multiple vertical wires. The ends of the wires 7 and 8 can be flattened to facilitate their insertion between the fixed contacts 70.

Figure 22:
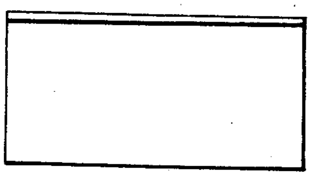
Figure 23:
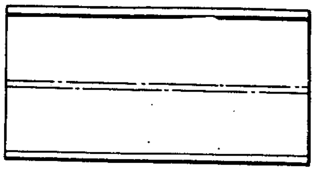

The removable bank can be constituted by a single frame with connecting ends of the vertical wires of the multiple on the top (Fig. 22). The wires can be split into several parts. Fig. 23 shows a sectioning in two parts at half the height; the half of the selectors thus have access to the lines leaving at the upper part and the other half to the lines leaving at the lower part.

Figure 24:
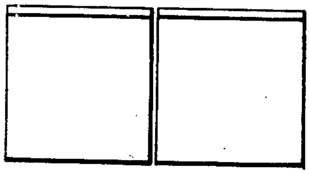
Figure 25:
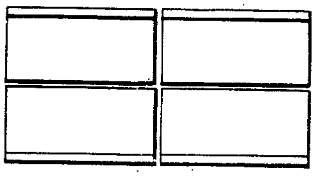

In order to facilitate the mounting operation, one can divide the frame of the bank in several parts, as shown on Figs. 24 and 25. In the case of Fig. 25, the bank has moreover been divided in the direction of its height.

It is well understood that one could, without departing from the scope of the invention, use the controlling and mounting devices for the movable bar in order to realize apparatus in which the movement of the said bar would cause any kind of control or operation.

What is claimed is:

1. A control system for cross-bar commutating mechanisms comprising a movable bar having a plurality of working positions and a rest position, a control device, means for moving said bar in either of two directions, clutch means attached to said bar, a two-portion interlocking device having a first portion attached to said bar and a second portion fixedly positioned with respect to said bar, said clutch means and both said portions movable in a direction normal to the direction of movement of said bar, means coupled between said control device and said second portion for engaging said clutch means with said moving means, said portions each having locking members associated therewith, said first portion having means for urging said first portion into locking relation with said second portion, said urging means operable when said bar is moved in either direction, means disposed between said bar and said clutch means for urging said clutch out of engagement with said moving means, said last named urging means adapted to become operative after completion of the movement of said moving means and locking of said portions, said locking means adapted to be released under control of said control device, and restoring means coupled to said bar for restoring said bar to its rest position after release of said locking means.

2. The control system as claimed in claim 1 wherein said means for restoring said movable bar to said rest position comprises a forcing member having a predetermined profiled section attached to said movable bar, and a spring-loaded lever engaging said profiled section, said lever comprising two parts, one of which engages and supports said forcing member and the other which is mounted on a fixed axis, and means adjustably attaching said parts to one another to vary the distance between said forcing member and said fixed axis, whereby the rest position of said movable bar can be adjusted.

3. A control system as claimed in claim 1 wherein the first portion of said interlocking device comprises a member connected by said first named urging means to said movable bar, said second portion comprises a member resiliently positioned for movement by said control device; said locking members comprising a hooked abutment at one end of said members, the two hooked abutments in the rest position of said bar abutting each other and wherein movement of said bar to a working position engages the hooked abutment of said first member with the hooked abutment of said second member to maintain said bar in a working position.

4. The control system as claimed in claim 1 wherein said control device comprises a relay having an armature provided with an aperture, a plate mounted on said armature, on operating rod, said operating rod at one end extending through said armature and attached to said plate and at its other end in operative engagement with said interlocking device and said engaging means, and means for adjusting the distance between said armature and said plate to adjust the position of engagement of said rod with said interlocking device and with said engaging means.

ANDRÉ J. MONTCHAUSSE.

References Cited in the file of this patent

UNITED STATES PATENTS

| Number | Name | Date |
|---|---|---|
| 2,082,911 | Schneckloth | June 8, 1937 |
| 2,111,118 | Lake | Mar. 15, 1938 |
| 2,258,269 | Stoner et al. | Oct. 7, 1941 |
| 2,261,761 | Hanson et al. | Nov. 4, 1941 |
| 2,286,799 | Frederick | June 16, 1942 |
| 2,347,738 | Harrison | May 2, 1944 |
| 2,479,678 | Graybill et al. | Aug. 23, 1949 |